United States Patent [19]
Yoshida

[11] Patent Number: 4,755,763
[45] Date of Patent: Jul. 5, 1988

[54] DEMODULATOR CAPABLE OF AVOIDING ABNORMAL DEMODULATION

[75] Inventor: Yasuharu Yoshida, Tokyo, Japan

[73] Assignee: NEC Corporation, Tokyo, Japan

[21] Appl. No.: 882,326

[22] Filed: Jul. 7, 1986

[30] Foreign Application Priority Data

Jul. 8, 1985 [JP] Japan .................................. 60-150410

[51] Int. Cl.$^4$ ........................ H03D 3/00; H03D 3/18; H03K 9/10
[52] U.S. Cl. ..................................... 329/50; 329/109; 329/135; 375/39
[58] Field of Search ................ 329/50, 109, 124, 122, 329/135; 375/39, 80, 81, 83, 86, 94, 97, 120; 455/214, 337

[56] References Cited

U.S. PATENT DOCUMENTS

| | | | |
|---|---|---|---|
| 4,285,062 | 8/1981 | Yoshida et al. | 375/20 |
| 4,525,676 | 6/1985 | Atobe et al. | 329/50 |
| 4,549,142 | 10/1985 | Yoshida | 329/50 |

Primary Examiner—Eugene R. Laroche
Assistant Examiner—David Mis
Attorney, Agent, or Firm—Sughrue, Mion, Zinn, Macpeak, and Seas

[57] ABSTRACT

In a demodulator for use in demodulating a quadrature amplitude modulated signal into a first and a second digital signal by the use of a reproduction of a carrier wave, a pull-in phase is detected by a pull-in phase discriminator (55) after establishment of synchronization. The reproduction of the carrier wave is momentarily phase shifted in a phase modulator (65, 65') with reference to the pull-in phase and is produced as a phase shifted carrier signal. The resultant pull-in phase is momentarily corrected to avoid abnormal demodulation. Detection of the pull-in phase is possible either by monitoring a demodulating analog signal and the first and the second digital signals or by monitoring only the first and the second digital signals. The phase modulator may be either a two-phase modulator or a $n\pi/2$-phase one where n is a natural number between unity and three, both inclusive.

9 Claims, 5 Drawing Sheets

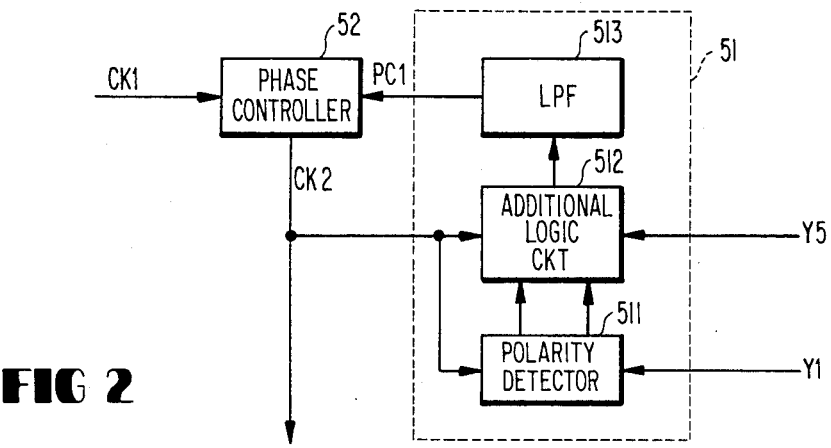
FIG 2
FIG 3
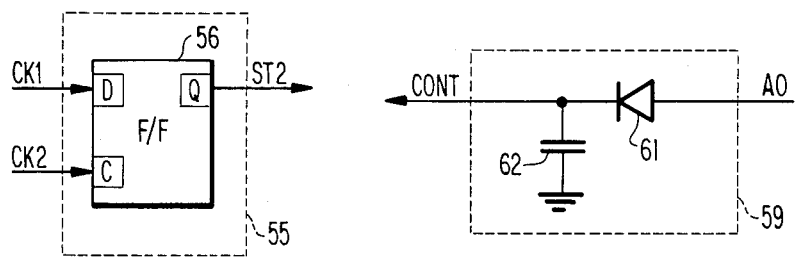
FIG 5
FIG 4
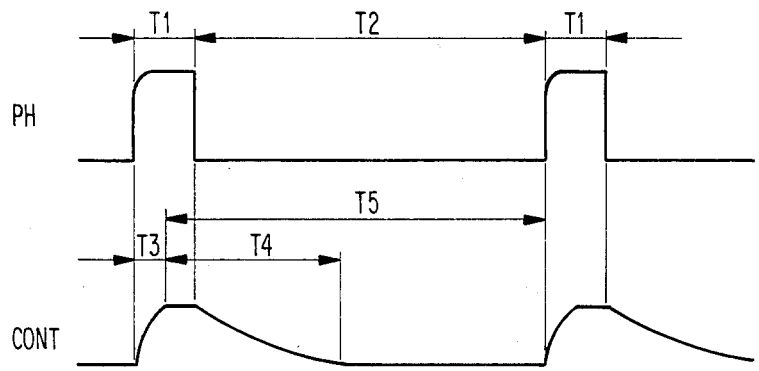

DEMODULATOR CAPABLE OF AVOIDING ABNORMAL DEMODULATION

BACKGROUND OF THE INVENTION

This invention relates to a demodulator for use in demodulating a modulated signal into a demodulated signal in a digital communication system. It is to be noted here that the modulated signal is subjected to quadrature amplitude modulation and that the demodulated signal is produced in the form of a pair of digital signals which are assigned to an in-phase and a quadrature phase channels, respectively.

In a digital communication system, a modulator and a demodulator are included in a transmitting end and a receiving end, respectively, which may be coupled to each other through a radio channel. The modulator carries out quadrature amplitude modulation to produce the modulated signal while the demodulator carries out coherent detection so as to improve a carrier-to-noise ratio.

On carrying out the coherent detection, a carrier wave should be reproduced in the demodulator. For this purpose, the demodulator is equipped with a phase-locked loop circuit. It is to be noted here that the phase-locked loop circuit is kept in a pull-in state specified by a pull-in phase when synchronization is established in the demodulator.

As known in the art, the pull-in state is ambiguous in the phase-locked loop circuit. Such ambiguity of the pull-in phase often gives rise to abnormal demodulation, such as cross demodulation, inverse demodulation, which is different from normal demodulation. In the interim, the cross demodulation is such that data signals to be assigned to the in-phase and the quadrature phase channels appear in the quadrature phase and the in-phase channels, respectively. On the other hand, the inverse demodulation is such that each polarity of the digital signals in the demodulated signal is inversed relative to a normal polarity thereof.

Anyway, the abnormal demodulation reproduces a wrong demodulated signal different from an original data signal and should therefore be restored to the normal demodulation.

Heretofore, various methods are proposed to produce a correct demodulated signal identical with the original data signal. For example, differential logic conversion of the digital signals is carried out in the transmitter and the receiver ends in U.S. Pat. No. 4,285,062 issued to Y. Yoshida et al. Alternatively, ambiguity of the pull-in phase is removed without differential logic conversion in Unexamined Japanese Patent Publication Syo No. 56-43855, namely, 43855/1981.

Anyway, the above-mentioned methods logically process the digital signals produced in the demodulator so as to reduce or remove the ambiguity of the pull-in phase.

It is a recent trend that levels or values to be conveyed by the modulated signal increase in number in the quadrature amplitude modulation. For example, the number of the values becomes equal to 256 or so.

Herein, it is assumed that the ambiguity in the pull-in phase is present in the phase-locked loop circuit of the receiving end and that the abnormal demodulation occurs in the demodulator. In this event, it should be noted that a waveform of the demodulated signal is distorted relative to an optimum waveform thereof due to a linear distortion occurring in baseband transmission facilities of the transmitting and the receiving ends, in particular, due to a linear distortion of a band restriction circuit responding to a digital multiplexed signal in the transmitting end.

As a rule, distortion of a demodulated analog signal is compensated by controlling any circuitry in the baseband transmission facilities or an equalizer. Such compensation is effective when the number of values or levels of the modulated signal is equal to or smaller than sixty-four.

However, the linear distortion becomes serious when the number of values is increased to 256. As a result, the above-mentioned compensation becomes ineffective and the abnormal demodulation becomes unavoidable even when the above-mentioned methods are adopted. This is because distortion of the demodulated analog signal can not be removed even when the digital signals are processed in the conventional methods mentioned above.

Therefore, the abnormal demodulation inevitably occurs on carrying out the above-mentioned compensation and makes a bit error rate of the digital signals large. This makes the normal demodulation difficult in the demodulator.

SUMMARY OF THE INVENTION

It is an object of this invention to provide a demodulator which is capable of effectively avoiding abnormal demodulation.

It is another object of this invention to provide a demodulator of the type described, wherein a bit error rate can be reduced even when values of a modulated signal are increased in number.

A demodulator to which this invention is applicable comprises demodulation means for demodulating a modulated signal subjected to quadrature amplitude modulation into a first and a second digital signal when the demodulator is put into a pull-in state and generating means responsive to the first and the second digital signals for generating a reproduction of a carrier wave with reference to the first and the second digital signals. According to this invention, the demodulator further comprises pull-in phase detecting means coupled to the demodulation means for detecting the pull-in state to produce a pull-in phase signal indicative of a pull-in phase, phase shift means coupled to the pull-in phase detecting means and the generating means for shifting a phase of the reproduction of the carrier wave in accordance with the pull-in phase signal to produce a phase shifted signal, and means for supplying said phase shifted signal to the demodulation means to make the demodulation means carry out the demodulation.

BRIEF DESCRIPTION OF THE DRAWING

FIG. 2 is a block diagram of a part of the demodulator illustrated in FIG. 1 in detail;

FIG. 3 is a block diagram of a pull-in phase discriminator of the demodulator illustrated in FIG. 1;

FIG. 4 is a time chart for use in describing operation of the demodulator illustrated in FIG. 1;

FIG. 5 is a circuit diagram of a phase correction circuit of the demodulator illustrated in FIG. 1;

DESCRIPTION OF THE PREFERRED EMBODIMENTS

Figure 1A:
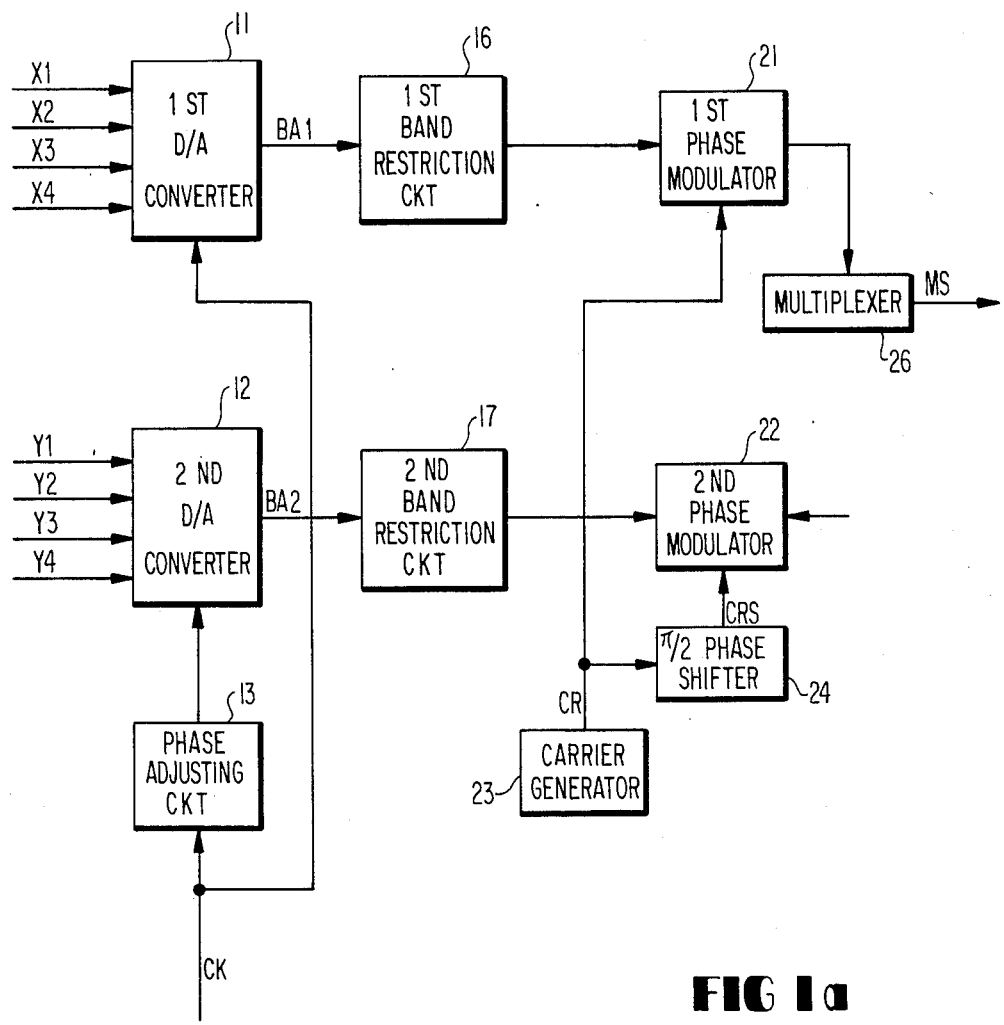
FIGS. 1(a) and 1(b) show a block diagram for use in describing a digital communication system which comprises a modulator and a demodulator according to a first embodiment of this invention, respectively.
Figure 1B:
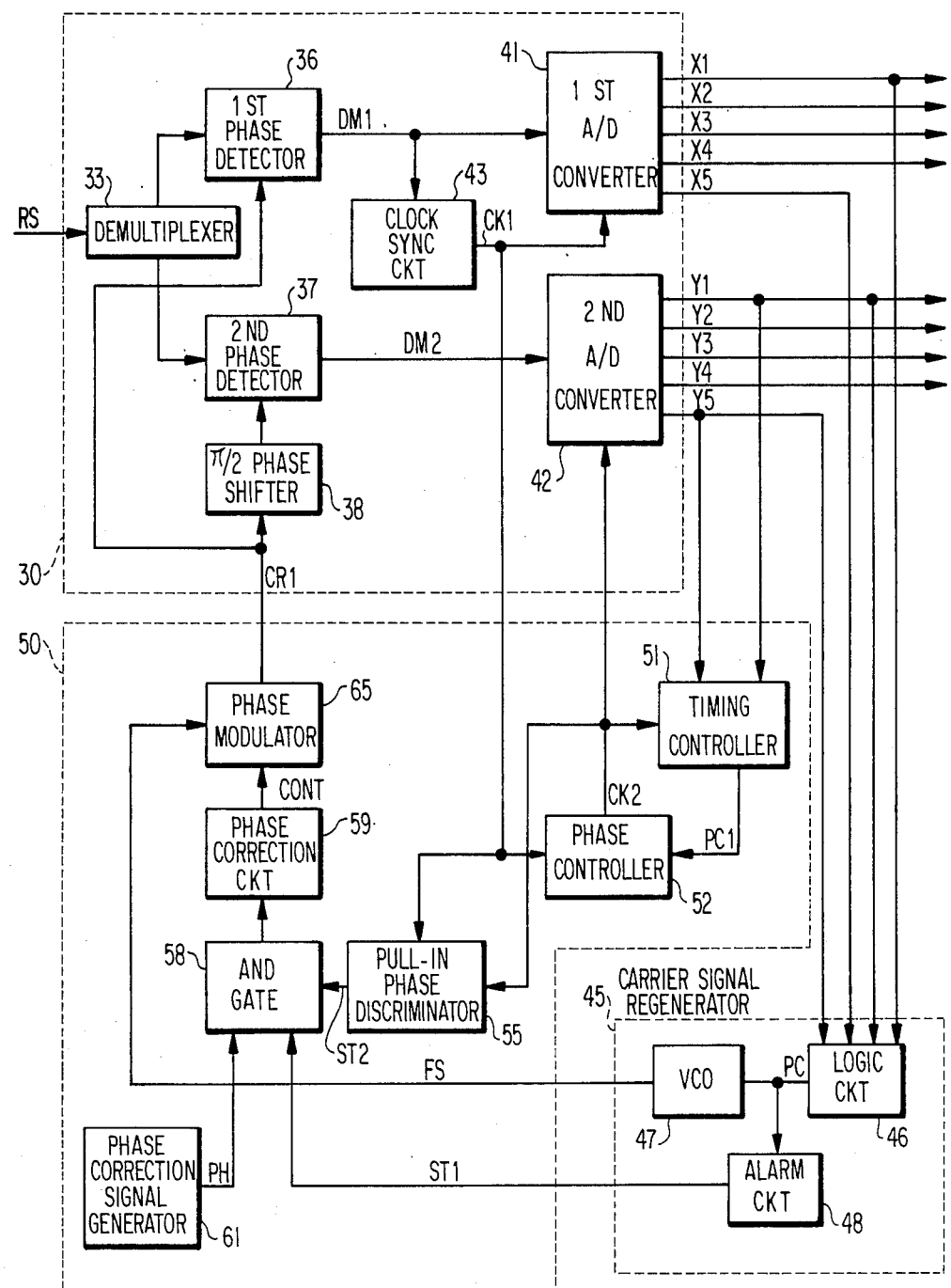

Referring to FIGS. 1(a) and 1(b), description will be made as regards a digital communication system which comprises a transmitting end and a receiving end. The transmitting end is specified by a modulator as shown in FIG. 1(a) while the receiving end is specified by a demodulator according to a first embodiment of this invention, as shown in FIG. 1(b). At any rate, multi-level quadrature amplitude modulator (QAM) is carried out in the illustrated modulator. In the example being illustrated, levels of the multi-level quadrature amplitude modulation are assumed to be equal to 256. Accordingly, such quadrature amplitude modulation may be called 256 QAM.

In FIG. 1(a), the modulator per se is supplied with a first input signal of an in-phase channel and a second input signal of a quadrature channel. The in-phase and the quadrature channels will be referred to as P- and Q-channels, respectively.

The first input signal consists of first through fourth P-channel data signals X1 to X4, respectively, while the second input signal consists of first through fourth Q-channel data signals Y1 to Y4, respectively. The P- and the Q-channel data signals X1 to X4 and Y1 to Y4 are fed to first and second digital-to-analog (D/A) converters 11 and 12 to which a clock signal CK of a clock frequency is supplied directly and through a phase adjusting circuit 13, respectively. The clock signal CK is produced by a clock generator (not shown). The phase adjusting circuit 13 serves to provide a predetermined delay to the clock signal CK and to give a delayed clock signal to the second digital-to-analog converter 12.

The first digital-to-analog converter 11 carries out digital-to-analog conversion of the first through fourth P-channel data signals X1 to X4 by the use of the clock signal CK to produce a first analog baseband signal BA1. Likewise, the second digital-to-analog converter 12 carries out digital-to-analog conversion of the first through fourth Q-channel data signals Y1 to Y4 by the use of the delayed clock signal to produce a second analog baseband signal BA2. Consequently, the second analog baseband signal BA2 is delayed relative to the first analog baseband signal BA1 by a phase difference determined by the predetermined delay of the phase adjusting circuit 13.

The first and the second analog baseband signals BA1 and BA2 are sent through first and second band restriction circuits 16 and 17 to first and second phase modulators 21 and 22, respectively. The first phase modulator 21 is supplied from a carrier generator 23 with a carrier signal CR of a carrier frequency. On the other hand, the second phase modulator 22 is coupled to a $\pi/2$ phase shifter 24 and is supplied with a phase shifted carrier signal CRS through the $\pi/2$ phase shifter 24. The phase shifted carrier signal CRS is phase shifted by $\pi/2$ radians relative to the carrier signal CR.

At any rate, the first phase modulator 21 phase modulates the carrier signal CR by the first analog baseband signal BA1 given through the first band restriction circuit 16 to produce a first phase modulated signal. The second phase modulator 22 phase modulates the phase shifted carrier signal CRS by the second analog signal BA2 given through the second band restriction circuit 17 to produce a second phase modulated signal.

The first and the second phase modulated signals are multiplexed or combined by a multiplexer or combiner 26 into a multiple quadrature amplitude modulated signal MS subjected to the multiple quadrature amplitude modulation. The multiple quadrature amplitude modulated signal MS is sent to the receiving end through a radio channel in a well known manner.

In FIG. 1(b), the multiple quadrature amplitude modulated signal MS is received as a reception modulated signal RS which will be simply called a modulated signal. The modulated signal RS is supplied to a demodulation circuit 30 of the demodulator and demodulated by the demodulation circuit 30 into first and second digital signals which may collectively be called a demodulated signal. The first digital signal consists of first through fifth P-channel digital signals while the second digital signal consists of first through fifth Q-channel digital signals. The first through fourth P-channel digital signals correspond to the first through fourth P-channel data signals X1 to X4 (FIG. 1(a)), respectively, and will therefore be represented by X1 to X4, respectively. The first through fourth Q-channel digital signals correspond to the first through fourth Q-channel data signals Y1 to Y4, respectively, and will be depicted at Y1 to Y4, respectively. The fifth P-channel and the fifth Q-channel digital signals depicted at X5 and Y5 are representative of error components appearing on demodulation and might be called first and second error signals, respectively. The remaining signals, such as X1 to X4 and Y1 to Y4, may be called main signals.

More particularly, the modulated signal RS is split or demodulated by a splitter or demultiplexer 33 to be sent to first and second phase detectors 36 and 37. The first phase detector 36 is supplied with a reproduced carrier signal CR1 which is produced in a manner to be described later and which is a reproduction of the carrier signal CR produced in the carrier generator 23. The reproduced carrier signal CR1 is given to the second phase detector 37 through a $\pi/2$ phase shifter 38 and is therefore phase shifted by $\pi/2$ radians.

Anyway, the first and the second phase detectors 36 and 37 carry out coherent detection of the modulated signal RS to produce first and second analog demodulated signals DM1 and DM2 corresponding to the first and the second baseband signals BA1 and BA2, respectively. The first and the second analog demodulated signals DM1 and DM2 are sent to first and second analog-to-digital (A/D) converters 41 and 42 to be converted into the first and the second digital signals, respectively.

The first analog demodulated signal DM1 is also sent to a clock synchronization circuit 43 which comprises phase synchronization circuitry for extracting a first clock signal CK1 from the first analog demodulated signal DM1. The first clock signal CK1 is given to the first analog-to-digital converter 41. The first analog-to-digital converter 41 converts the first analog demodulated signal DM1 into the first through fifth P-channel digital signals X1 to X5 by the use of the extracted clock signal CK1.

On the other hand, the second analog demodulated signal DM2 is converted into the first through fifth Q-channel digital signals Y1 to Y5 with reference to a second clock signal CK2 produced in a manner to be described later.

The first and the second clock signals CK1 and CK2 are produced in synchronism with the P- and the Q-channel digital signals X1 to X5 and Y1 to Y5, respectively, and may be referred to as first and second timing signals.

The illustrated demodulator comprises a carrier signal regenerator 45 comprising a logic circuit 46 and a voltage-controlled oscillator (VCO) 47 coupled to the logic circuit 46, and an alarm circuit 48 coupled to the logic circuit 46. The logic circuit 46 is supplied with the first and the fifth P-channel digital signals X1 and X5 and with the first and the fifth Q-channel digital signals Y1 and Y5 to carry out a predetermined calculation and to produce a phase control signal PC. The logic circuit 46 may be similar to that illustrated in Unexamined Japanese Patent Publication No. 57-131151, namely, 131151/1982. For example, the logic circuit 46 comprises a first Exclusive-OR gate for the first P-channel digital signal X1 and the fifth Q-channel digital signal Y5, a second Exclusive OR gate for the first Q-channel digital signal Y1 and the fifth P-channel digital signal X5, and a subtractor coupled to both of the first and the second Exclusive-OR gates. The phase control signal PC is sent from the logic circuit 46 to the voltage-controlled oscillator 47 and is also sent to the alarm circuit 48.

The voltage controlled oscillator 47 is controlled by the phase control signal PC to produce a controlled frequency signal, namely, a reproduction of a carrier wave FS. On the other hand, the alarm circuit 48 monitors a phase-locked loop to detect whether or not the phase-locked loop is put into a pull-in state when phase synchronization is established. When the phase-locked loop is put in the pull-in state, an impedance of the phase-locked loop is reduced and is, otherwise, increased. Accordingly, it is possible to detect whether or not the phase-locked loop is put in the pull-in state by monitoring the phase control signal PC. In the example being illustrated, the alarm circuit 48 produce a logic "1" level signal when the phase-locked loop is in the pull-in state. Otherwise, the alarm circuit 48 produces a logic "0" level signal. Each of the logic "1" and "0" level signals is produced as a synchronization status signal ST1 representative of synchronization status of the phase-locked loop.

In FIG. 1(b), the demodulator further comprises a pull-in phase control circuit 50 coupled to the demodulation circuit 30 and the carrier signal regenerator 45. The pull-in phase control circuit 50 comprises a timing controller 51 operable in response to the first and the fifth Q-channel digital signals Y1 and Y5 and a phase controller 52 supplied with the first clock signal CK1 from the clock synchronization circuit 43. The timing controller 51 and the phase controller 52 serve as a timing synchronization system together with the second analog-to-digital converter 42 and the clock synchronization circuit 43.

Referring to FIG. 2 together with FIG. 1, the timing controller 51 is supplied with the first and the fifth Q-channel digital signals Y1 and Y5 and with the second clock signal CK2 to produce a local phase control signal PC1. As shown in FIG. 2, the timing controller 51 comprises a polarity detector 511, an additional logic circuit 512, and a low pass filter 513 and is similar in structure and operation to that described with reference to Unexamined Japanese Patent Publication No. 61-5661, namely, 5661/1986. Therefore, no description will be made as regards the timing controller 51 any longer. At any rate, the timing controller 51 produces the local phase control signal PC1 in the manner described in conjunction with the above-referenced patent publication.

Supplied with the first clock signal CK1 and the local phase control signal PC1, the phase controller 52 controls a phase of the first clock signal CK1 in accordance with the local phase control signal PC1 to produce a phase controlled signal which has an optimum timing for the analog-to-digital conversion of the second analog-to-digital converter 42. The phase controller 52 is also mentioned in detail in the above-referenced publication and will not be described also. The phase controlled signal is sent as the second clock signal CK2 to the second analog-to-digital converter 42 and to the timing controller 51. As a result, the analog-to-digital conversion is carried out at the optimum timing in the second analog-to-digital converter 42. Thus, the second clock signal CK2 defines the timing suitable for extracting the second digital signal from the second analog demodulated signal DM2.

Referring to FIG. 3 afresh and FIG. 1 again, the first and the second clock signals CK1 and CK2 are sent to a pull-in phase discriminator 55 for discriminating a pull-in state. As shown in FIG. 3, the pull-in phase discriminator 55 comprises a type-D flip flop 56 having a data input terminal D for the first clock signal CK1, a clock terminal C for the second clock signal CK2, and a set output terminal Q for an output signal ST2. When the second clock signal CK2 has a leading phase relative to the first clock signal CK1, namely, when the pull-in phase is not normal, the logic "1" level signal is supplied as the output signal ST2 through the set output terminal Q. To the contrary, the output signal ST2 takes the logic "0" level signal when the second clock signal CK2 has a delayed phase relative to the first clock signal CK1, namely, when the pull-in phase is normal. Thus, the output signal ST2 is representative of status of the pull-in phase and may therefore be named a pull-in phase signal.

A combination of the timing controller 51, the phase controller 52, and the pull-in phase discriminator 55 serves to detect the pull-in phase and to produce the pull-in phase signal ST2 and may be referred to as a pull-in phase detecting circuit.

The pull-in status signal ST2 is supplied to an AND gate 58 responsive to the synchronization status signal ST1. The AND gate 58 is also responsive to a phase correction signal PH given from a phase correction signal generator 61.

Temporarily referring to FIG. 4, the phase correction signal generator 61 produces the phase correction signal PH as illustrated along a top line of FIG. 4. The phase correction signal PH is formed by a rectangular pulse signal which takes the logic "1" level during a first time interval T1 and the logic "0" level during a second time interval T2 following the first time interval T1. The first and the second time intervals T1 and T2 are determined in a manner to be described later.

In FIG. 1(b), the AND gate 58 allows the phase correction signal PH to pass therethrough only when both the pull-in phase signal ST2 and the synchronization status signal ST1 take the logic "1" level. In other words, the phase correction signal PH is sent through the AND gate 58 to a phase correction circuit 59 as an AND gate output signal AO when the second clock signal CK2 has the leading phase relative to the first clock signal CK1 after establishment of phase synchronization is indicated by the logic "1" level of the synchronization status signal ST1. On the other hand, the phase correction signal PH is never supplied to the phase correction circuit 59 insofar as the phase synchronization is not established. In addition, the phase correction signal PH is not sent to the phase correction circuit 59 when the pull-in phase signal ST2 takes the logic "0" level, namely, when the first clock signal CK1 has a leading phase relative to the second clock signal CK2.

Referring to FIG. 5 together with FIG. 1(b), the phase correction circuit 59 comprises a diode 61 and a capacitor 62 connected between the diode 61 and ground. Supplied with the AND gate output signal AO as shown at PH in FIG. 4, the phase correction circuit 59 produces a control signal as depicted at CONT in FIG. 4.

The control signal CONT reaches a peak level from a reference level within a third time interval T3 shorter than the first time interval T1 and returns back to the reference level after lapse of a fourth time interval T4. In FIG. 4, a fifth time interval T5 is defined after lapse of the third time interval T3 and lasts until appearance of the next following AND gate output signal AO, namely, the phase correction signal PH. It is to be noted that the fourth time interval T4 is shorter than the fifth time interval T5.

In FIG. 1(b), the control signal CONT is sent to a phase modulator 65 operable in response to the reproduction of carrier wave, namely, the controlled frequency signal FS given from the voltage-controlled oscillator 47. The controlled frequency signal FS is subjected to phase modulation only in the presence of the control signal CONT and shifted by $\pi/2$ radians for each control signal CONT. As a result, the phase modulator 65 delivers a phase shifted carrier signal to the first phase detector 36 and the $\pi/2$ phase shifter 38 as the reproduced carrier signal CR1 when the phase modulation is carried out in the phase modulator 65. At any rate, the illustrated phase modulator 65 is a two-phase modulator known in the art.

Thus, a combination of the phase correction signal generator 61, the AND gate 58, the phase correction circuit 59, and the phase modulator 65 is operable to shift the phase of reproduction of carrier wave and may be called a phase shift circuit. The phase modulation of the controlled frequency signal FS is carried out each time when the AND gate output signal AO is produced from the AND gate 58 as mentioned above.

Let the pull-in phase be normal with the phase-locked loop for the reproduced carrier signal CR1 put in a synchronous state. In this event, the first and the second clock signals CK1 and CK2 correctly correspond to the P-channel and the Q-channel, respectively. That is, the first clock signal CK1 precedes the second clock signal CK2 by the predetermined time due to phase adjustment carried out in the modulator. Accordingly, the pull-in phase discriminator 55 produces the pull-in phase signal ST2 of the logic "0" level. As a result, no control signal CONT is supplied from the phase correction circuit 59 to the phase modulator 65. The controlled frequency signal FS is sent through the phase modulator 65 to the first phase detector 36 and the $\pi/2$ phase shifter 38 as it stands.

Let the pull-in phase be not normal after establishment of the synchronization in the phase-locked loop and cross modulation take place between the P-channel and the Q-channel. In this event, the first input signal of P-channel is reproduced as the second digital signal of Q-channel while the second input signal of Q-channel is reproduced as the first digital signal of P-channel. Under the circumstances, the pull-in phase discriminator 55 produces the pull-in phase signal of the logic "1" level with the synchronization status signal ST1 kept at the logic "1" level. Accordingly, the phase correction signal PH is sent through the AND gate 58 and the phase correction circuit 59 to the phase modulator 65 as the control signal CONT as shown in FIG. 4. The illustrated phase modulator 65 carries out phase modulation of the controlled frequency signal FS by $\pi/2$ radians in response to the control signal CONT.

In FIG. 4, such phase modulation of $\pi/2$ radians is momentarily carried out during the third time interval T3. The third time interval T3 is so short enough in comparison with a response speed of the phase-locked loop for the reproduced carrier signal CR1 that a phase variation of $\pi/2$ radians is not compensated by the phase-locked loop. Consequently, the controlled frequency signal FS is shifted in phase by $\pi/2$ radians into the reproduced carrier signal CR1. Thus, the pull-in phase is turned into a normal pull-in phase.

The above-mentioned phase modulation is stopped after lapse of the fourth time interval T4. However, the normal pull-in phase is kept unchanged because the fourth time interval T4 is considerably longer than the response speed of the phase-locked loop.

Once the pull-in phase becomes normal, the pull-in phase signal ST2 is turned into the logic "0" level. This is because the fifth time interval T5 is selected so that the fifth time interval T5 sufficiently becomes longer than a response speed of the clock synchronization system including the pull-in phase discriminator 55. Accordingly, no control signal CONT is supplied from the phase correction circuit 59 to the phase modulator 65.

The phase modulation of the controlled frequency signal FS is continued as long as the pull-in phase does not become normal. In this case, the phase correction signal PH is successively supplied to the phase modulator 65 as the control signal CONT. Consequently, the controlled frequency signal FS is subjected to the phase modulation of $\pi/2$ radians each time when the control signal CONT is given to phase modulator 65.

As mentioned above, the pull-in phase is automatically and momentarily modified at a step of $\pi/2$ radians with reference to the pull-in phase signal ST2 representative of whether or not the pull-in phase is kept normal in the phase-locked loop for the reproduced carrier signal CR1. As a result, the pull-in phase is restored to the normal pull-in phase and the first and the second digital signals (X1 to X5) and (Y1 to Y5) are normally reproduced by the first and the second analog-to-digital converters 41 and 42 without any abnormal demodulation, such as cross demodulation, inverse demodulation.

Figure 6:
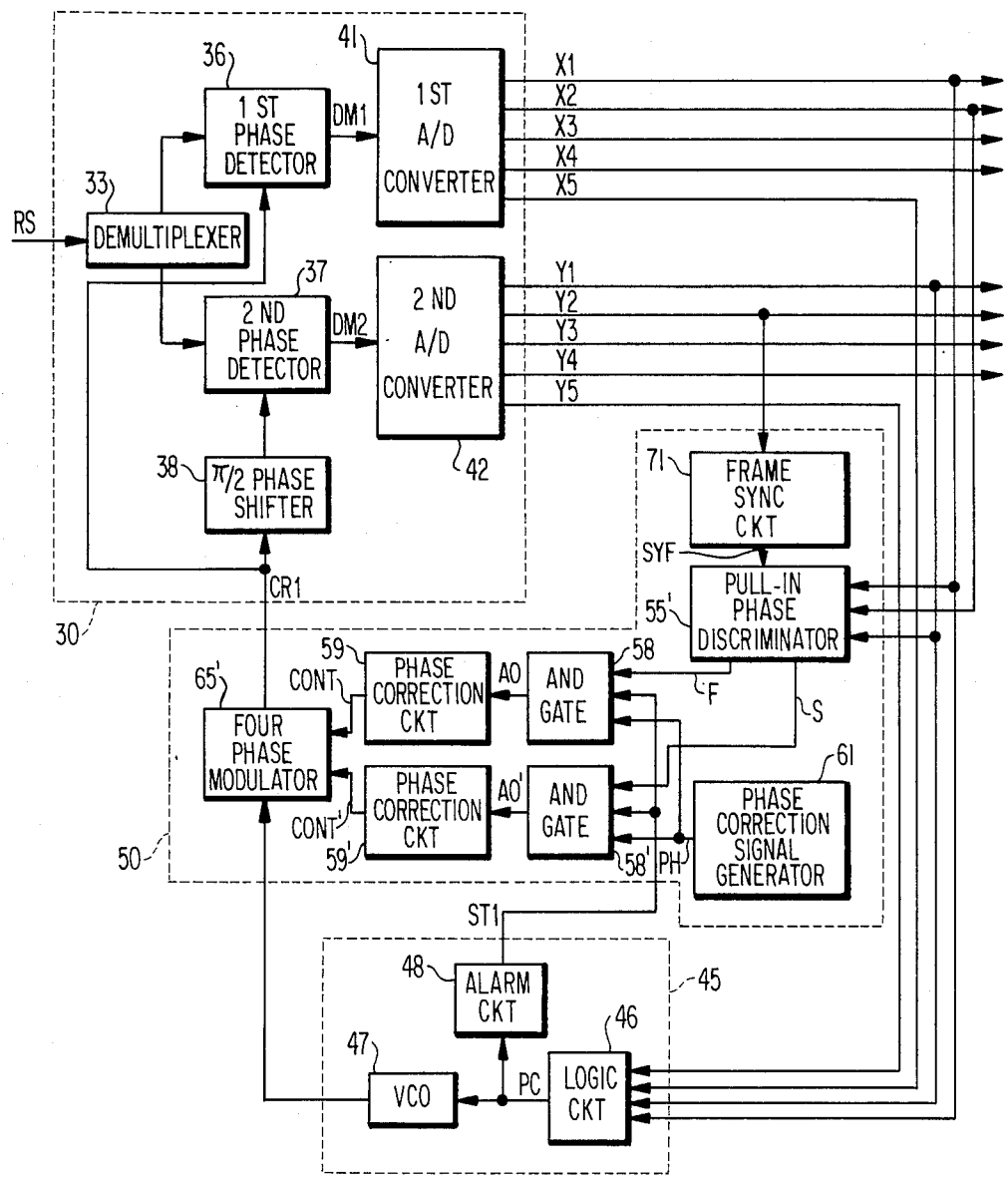
FIG. 6 is a block diagram of a demodulator according to a second embodiment of this invention.

Referring to FIG. 6, a demodulator according to a second embodiment of this invention comprises similar parts and signals designated by like reference numerals and symbols. In FIG. 6, the demodulation circuit 30 does not include the clock synchronization circuit 43 illustrated in FIG. 1(b). In addition, the pull-in phase control circuit 50 illustrated in FIG. 6 is somewhat modified from that shown in FIG. 1(b) and will be described later in detail.

Figure 7:
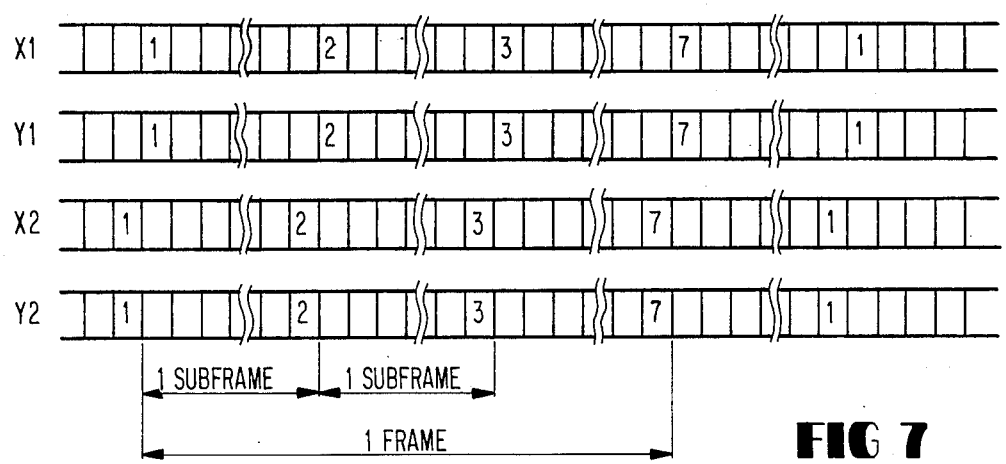
FIG. 7 is a time chart for use in describing digital signals which are reproduced by the demodulator illustrated in FIG. 6.

Temporarily referring to FIG. 7, the demodulator illustrated in FIG. 6 is supplied with the modulated signal RS which can be reproduced into the first and the second digital signals exemplified by X1, Y1, X2, and Y2 in FIG. 7. More specifically, each of the digital signals X1, Y1, X2, and Y2 is divided into a plurality of frames each of which is subdivided into first through seventh subframes. Each subframe is specified by a frame pulse numbered from unity to seven. In each digital signal, a combination of seven frame pulses forms a pseudo noise pattern and serves to establish frame synchronization, as mentioned in Unexamined Japanese Patent Publication No. 120308/1979 referenced above. The seven frame pulses are inserted into the first P- and Q-channel digital signals at the same timings. On the other hand, each frame pulse of the second P- and Q-channel digital signals X2 and Y2 are shifted by one bit relative to that of the first P- and Q-channel digital signals X1 and Y1 in order to avoid nonuniformity of modulation resulting from the frame pulses. Such shift of the frame pulses serves to randomize the modulation.

The frame pulses are also distributed into the remaining digital signals X3, X4, Y3, and Y4 in a similar manner and may be either shifted or not shifted relative to those of X1, Y1, X2, and Y2.

At any rate, it is possible to establish synchronization by monitoring the second Q-channel digital signal Y2 as mentioned in the above-referenced publication.

In FIG. 6, the illustrated carrier signal regenerator 45 is supplied with the first and the fifth P-channel digital signals X1 and X5 and with the first and the fifth Q-channel digital signals Y1 and Y5, like in FIG. 1(b). The logic circuit 46 in the carrier signal regenerator 45 produces the phase control signal PC in a manner similar to that of FIG. 1(b). The controlled frequency signal, namely, reproduction of a carrier wave FS is produced from the voltage-controlled oscillator 47 in response to the phase control signal PC in a well-known manner.

Now, the pull-in phase control circuit 50 shown in FIG. 6 comprises a frame synchronization circuit 71 supplied with the second Q-channel digital signal Y2. The frame synchronization circuit 71 monitors the second Q-channel digital signal Y2 to produce a sequence of frame synchronization pulses SYF in the manner described in the above-referenced publication. The frame synchronization pulses SYF are assumed to be produced at every frame.

Figure 8:
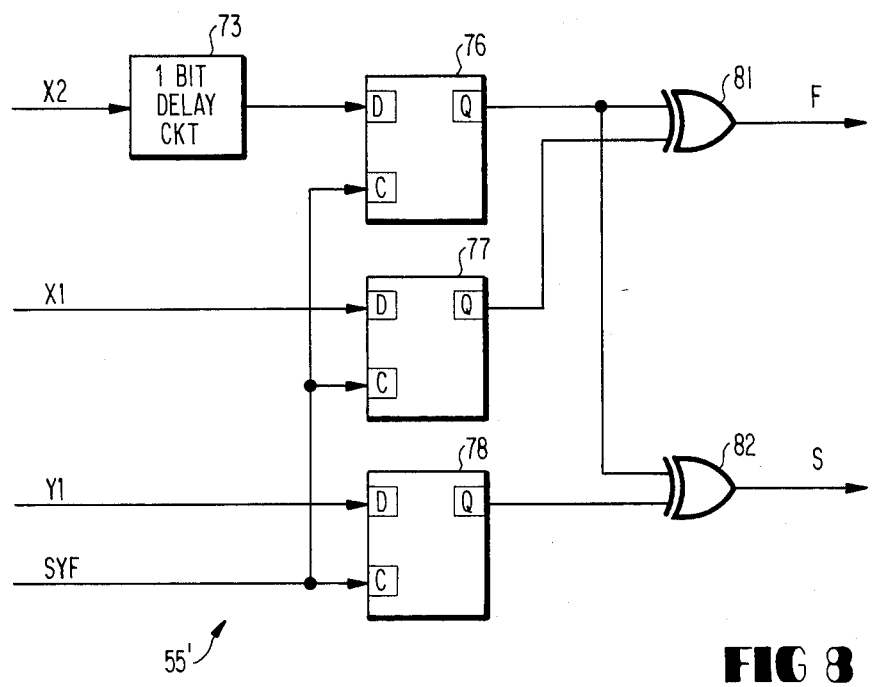
FIG. 8 is a block diagram of a pull-in phase discriminator of the demodulator illustrated in FIG. 6.

Referring to FIG. 8 together with FIG. 6, a pull-in phase discriminator depicted at 55' is supplied with the first and the second P-channel digital signals X1 and X2 and with the first Q-channel digital signal Y1 together with the frame synchronization pulses SYF. In FIG. 8, the second P-channel digital signal X2 is sent through a one bit delay circuit 73 to a first type-D flip flop 76 while the first P-channel and the first Q-channel digital signals X1 and Y1 are supplied direct to second and third type-D flip flops 77 and 78, respectively. The frame synchronization pulses SYF are simultaneously delivered to the first through third type-D flip flops 76 to 78 coupled to first and second Exclusive OR gates 81 and 82. The first and the second Exclusive OR gates 81 and 82 produce first and second bit signals F and S as a pull-in phase signal representative of a pull-in phase, respectively.

As readily understood from FIG. 7, the first through third type-D flip flops 76 to 78 are simultaneously supplied with the same frame pulses on reception of each frame synchronization pulse SYF when the pull-in phase is normal. As long as a normal pull-in phase is kept unchanged, the first through third type-D flip flops 76 to 78 have to produce the same flip flop output signals as one another. Therefore, the first and the second bit signals F and S of the pull-in phase signal are equal to (0, 0) during the normal pull-in phase.

When the pull-in phase is shifted by $\pi/2$ radians, $\pi$ radians, and $3\pi/2$ radians relative to the normal pull-in phase, the first and the second bit signals F and S of the pull-in phase signal take (1, 0), (1, 1), and (0, 1), respectively, as mentioned in the referenced publication.

The first bit signal F is sent to an AND gate (depicted at 58) which is supplied with the phase correction signal PH and the synchronization status signal ST2 from the phase correction signal generator 61 and the alarm circuit 48, respectively, like in FIG. 1(b). The AND gate 58 supplies the AND gate output signal AO to a phase correction circuit 59 similar to that illustrated in FIG. 1(b) in the manner mentioned in conjunction with FIG. 1(b). Consequently, a control signal (depicted at CONT) is fed from the phase correction circuit 59 to a four-phase modulator 65' like in FIG. 1(b).

In FIG. 6, an additional AND gate (depicted at 58') is supplied with the second bit signal S of the pull-in phase signal, the phase correction signal PH, and the synchronization status signal ST2. Like the AND gate 58, the additional AND gate 58' supplies an additional AND gate signal AO' to an additional phase correction circuit 59'. As a result, an additional control signal CONT' is sent from the additional phase correction circuit 59' to the four-phase modulator 65' in the manner mentioned in conjunction with the phase correction circuit 59. Each of the phase correction circuit 59 and the additional phase correction circuit 59' may be similar in structure to that illustrated in FIG. 5 and will not be described any longer.

As mentioned before, the first and the second bit signals F and S take one of four combinations (0, 0), (1, 0), (1, 1), and (0, 1) corresponding to the pull-in phases. As a result, the control signal CONT and the additional control signal CONT' take four states corresponding to the combinations of the first and the second bit signals F and S.

When the pull-in phase is normal, namely, equal to 0 radian, the phase correction signal PH is intercepted by the AND gate 58 and the additional AND gate 58' because the first and the second bit signals F and S take the logic "0" level. In this case, the four-phase modulator 65' carries out no modulation of the controlled frequency signal FS. Consequently, the controlled frequency signal FS is produced through the four-phase modulator 65' without phase modulation as the reproduced carrier signal CR1. Thus, no phase correction is carried out when the pull-in phase is normal.

Let the pull-in phase be shifted by $\pi/2$ radians relative to the normal pull-in phase. In this event, the first and the second bit signals F and S of the pull-in phase signal take (1, 0), respectively. The phase correction signal PH is sent through the AND gate 58 to the phase correction circuit 59 and is not sent to the additional phase correction circuit 59'. The phase correction circuit 59 produces the control signal CONT as illustrated in FIG. 4 to modulate the controlled frequency signal FS in the four-phase modulator 65'.

Likewise, the control signal CONT and the additional control signal CONT' are sent to the four-phase modulator 65' when the pull-in phase is shifted by $\pi$ radians relative to the normal pull-in phase. The controlled frequency signal FS is shifted by $\pi$ radians to be put into the normal pull-in phase.

When the pull-in phase is shifted by $3\pi/2$ radians relative to the normal pull-in phase, the additional control signal CONT' alone is sent from the additional phase correction circuit 59' to the four-phase modulator 65'. In this case, the controlled frequency signal FS is shifted by $3\pi/2$ radians to be restored to the normal pull-in phase.

With this structure, it is possible to compensate for both the cross demodulation and the inverse demodulation because the four-phase modulator 65'. When the cross demodulation alone may be compensated, a two-phase modulator may be used instead of the four-phase modulator 65'.

While this invention has thus far been described in conjunction with a few embodiments thereof, it will readily be possible for those skilled in the art to put this invention into practice in various other manners. For example, multi-level quadrature amplitude modulation of 16 values, 64 values, and 1024 values may be substituted for the multi-level quadrature amplitude modulation of 256 values. As regards the multi-level quadrature amplitude modulation, the digital signals of the receiving end should be divided into a main signal, such as the first through fourth P-channel digital signals X1 to X4, and the error signal, such as the fifth P-channel digital signal X5. As regards the modulation of 16 values, 64 values, and 1024 values, the main signal and the error signal are tabulated in Table 1.

TABLE 1

|  | Transmitting End | | | Receiving End | | |
| --- | --- | --- | --- | --- | --- | --- |
|  | Values 16 | Values 64 | Values 1024 | Values 16 | Values 64 | Values 1024 |
| Main Signal | X1 | X1 | X1 | X1 | X1 | X1 |
|  | X2 | X2 | X2 | X2 | X2 | X2 |
|  | — | X3 | X3 | — | X3 | X3 |
|  | — | — | X4 | — | — | X4 |
|  | — | — | X5 | — | — | X5 |
| Error Signal |  |  |  | X3 | X4 | X6 |
| Main Signal | Y1 | Y1 | Y1 | Y1 | Y1 | Y1 |
|  | Y2 | Y2 | Y2 | Y2 | Y2 | Y2 |
|  | — | Y3 | Y3 | — | Y3 | Y3 |
|  | — | — | Y4 | — | — | Y4 |
|  | — | — | Y5 | — | — | Y5 |
| Error Signal |  |  |  | Y3 | Y4 | Y6 |

What is claimed is:

1. In a demodulator comprising demodulation means for demodulating a modulated signal subjected to quadrature amplitude modulation into a first and a second digital signal when said demodulator is put into a pull-in state with said first and said second digital signals having a pull-in phase and generating means responsive to said first and said second digital signals for generating a reproduction of a carrier wave with reference to said first and said second digital signals, the improvement wherein said demodulator further comprises:
   pull-in phase detecting means coupled to said demodulation means for detecting said pull-in phase to produce a pull-in phase signal indicative of the status of said pull-in phase;
   phase shift means coupled to said pull-in phase detecting means and said generating means and responsive to said pull-in phase signal for shifting a phase of said reproduction of the carrier wave in accordance with said pull-in phase signal to produce a phase shifted signal; and
   means for supplying said phase shifted signal to said demodulation means to make said demodulation means carry out demodulation.

2. A demodulator as claimed in claim 1, said demodulation means comprising signal producing means responsive to said modulated signal for producing a first and a second analog demodulated signal and converting means coupled to said signal producing means for converting said first and said second analog demodulated signals into said first and said second digital signals, respectively, wherein said pull-in phase detecting means comprises:
   means coupled to said signal producing means and said converting means for producing first and second timing signals synchronized with said first and said second digital signals, respectively; and
   discriminating means responsive to said first and said second timing signals for discriminating said pull-in state from said first and said second timing signals to produce said pull-in phase signal.

3. A demodulator as claimed in claim 2, wherein said phase shift means comprises:
   phase correction signal producing means for producing a phase correction signal; and
   phase modulation means responsive to said reproduction of the carrier signal and said phase correction signal and coupled to said discriminating means for carrying out phase modulation of said reproduction of the carrier wave with reference to said pull-in phase signal and said phase correction signal.

4. A demodulator as claimed in claim 3, wherein said phase modulation means comprises:
   gate means for gating said phase correction signal with reference to said pull-in phase signal to produce a gate output signal; and
   modulating means for phase modulating said reproduction of the carrier wave by said gate output signal to produce said phase shifted signal.

5. A demodulator as claimed in claim 4, wherein said modulating means comprises:
   a two-phase modulator for phase modulating the reproduction of said carrier by said gate output signal to change the phase of said reproduction by $\pi/2$ radians each time when said gate output signal is supplied to said two phase modulator and to thereby produce said phase shifted signal.

6. A demodulator as claimed in claim 1, wherein said pull-in phase detecting means comprises:
   pull-in phase signal producing means for producing said pull-in phase signal in response to said first and said second digital signals;
   said phase shift means comprising:
   phase correction signal producing means for producing a phase correction signal; and
   phase modulation means coupled to said phase correction signal producing means and said pull-in phase signal producing means for carrying out phase modulation of said reproduction of the carrier wave with reference to said pull-in phase signal and said phase correction signal to produce said phase shifted signal.

7. A demodulator as claimed in claim 6, wherein said phase modulation means comprises:
   gate means for gating said phase correction signal with reference to said pull-in phase signal to produce a gate output signal; and
   modulating means for phase modulating said reproduction of the carrier wave by said gate output signal to produce said phase shifted signal.

8. A modulator as claimed in claim 7, wherein said modulating means comprises:

a phase modulator for phase modulating said reproduction of the carrier wave by said gate output signal to change the phase of the reproduction by $n\pi/2$ radians each time when said gate output signal is produced, where n is a natural number between unity and three, both inclusive.

9. A demodulator as claimed in claim 1, wherein said modulated signal specifies a predetermined number of levels that is not smaller than 256.

* * * * *